Patented Aug. 5, 1930

1,772,300

UNITED STATES PATENT OFFICE

EDWARD R. ALLEN, OF EAST ORANGE, AND ALFRED SIEGEL, OF HILLSIDE, NEW JERSEY, ASSIGNORS, BY MESNE ASSIGNMENTS, TO THE GRASSELLI CHEMICAL COMPANY, OF CLEVELAND, OHIO, A CORPORATION OF DELAWARE

ROSIN SOAP LAKE OF AZO COMPOUNDS

No Drawing.   Application filed March 16, 1928. Serial No. 262,332. REISSUED

This invention relates to the manufacture of lake pigments. More particularly it relates to lake pigments containing a substantial amount of rosin soap.

Rosin soap has been used for a number of years in the preparation of pigments to be used in the printing ink and other industries, but the amounts have been small, and the effect has been that the rosin soap functions merely as a dispersing agent. It has also been used to obtain a more desirable masstone in the case of certain colors. According to prior art practice the rosin soap has been added to the dye solution or to the commercial paste, and subsequently converted into the metallic soap simultaneously with the precipitation of the dyestuff.

A principal object of the present invention is to increase the yield of the dry product of lake pigments from a given amount of the dyestuff employed, i. e., to obtain a substantially higher yield of pigment from a given amount of dyestuff without a corresponding decrease in tinctorial strength as would be obtained in the use of an inert diluent. Another object of the invention is to increase the brilliancy and improve the power of the lake pigment to produce an ink of superior printing tone. A further object of the invention is the production of lake pigments having higher oil absorption, and other improved properties than those of the prior art. Other objects will appear as the description proceeds.

We have found that the use of substantial quantities of the metallic derivatives of rosin soap in lake pigments functions entirely differently than the smaller quantities heretofore used, and that according to our invention it results in the formation of a lake substratum which does not decrease the tinctorial strength of the final product, thus indicating that it does not in any way act as a diluent. Not only this but the tinctorial qualities are greatly improved, for example, a clearer, brighter masstone, more brilliant undertone and cleaner tint results, and the printing tone obtained by printing with an ink containing this material, is far superior to a similar product made according to the prior art. The results were not to be expected and were in no way indicated by the prior art. The tinctorial strength may also be determined by measuring the covering power by means of tinting out the pigment with white.

One of the outstanding merits of the pigment prepared according to this invention is that the inks made by grinding these pigments with litho varnish in the ordinary way produces a bronze free printing tone. For example, the printing inks made from pigments known in the trade as lithol reds and made according to the prior art, contain or possess a highly objectionable bronze printing tone.

In the case of those pigments which do not give rise to a bronzy printing tone, the comparative difference is not marked but our invention in this particular does result in a higher and more glossy finish on the printing as a result of the higher oil absorption and better working qualities of the pigment. It will be understood of course that this invention is not limited to the pigments referred to in the foregoing, but other pigments may be similarly modified.

The rosin soap is incorporated with the azo compound, preferably prior to its filtration, and the rosin soap is converted into a metallic soap simultaneously with the precipitation of the azo compound. Beneficial effects may be obtained, however, by the use of rosin soap according to our invention in connection with the use of a pigment dyestuff which is not precipitated as a metallic derivative as illustrated hereinafter. In a case of this kind the procedure is to add the soluble soap to the slurry of the pigment dyestuff prior to filtration, followed by the precipitation of the insoluble metallic soap, whereupon a rosin soap lake is formed.

It is to be understood that the term rosin soap as used in the following examples, and elsewhere in this application, refers to rosinates or the metallic derivatives of rosin.

As specific examples of procedure, in accordance with our invention, the following will serve, but it is to be understood that these examples are for illustrative purposes only and are not to be taken in any way as limitations of our invention.

Example I

A solution of the sodium salt of 2-naphthylamine 1-sulphonic acid corresponding to 111.5 parts of the free acid, is diazotized in the usual manner with 37.75 parts of sodium nitrite and 204 parts of muriatic acid 20° Bé. The major part of the excess mineral acid is then removed from the insoluble diazo body by means of washing. In a separate container a solution of 80 parts of beta naphthol and 30 parts of caustic soda is prepared and made to a volume corresponding to approximately 2500 parts of water. After the temperature of this solution has been adjusted to 25° C., the diazo suspension, referred to above, is introduced into the beta naphthol solution. The coupling proceeds rapidly and to good completion. The charge is then heated to 40° C.

To a solution of 26.5 parts of caustic soda in 325 parts of water there is added 75 parts of rosin. The volume is then brought to the equivalent of approximately 1900 parts of water, the preparation boiled to complete the saponification. This preparation of rosin soap is then run into the charge of the azo dye, described above, and the temperature and volume of the combining solutions so adjusted that the temperature of the resulting charge does not drop below 30° C.

The charge is then precipitated with a solution of 240 parts of barium chloride in 5000 parts of water, brought to a boil, and the product then washed, filtered, dried, and ground in the usual manner.

The yield is approximately 315 parts of dry product compared with 225 parts in a charge prepared without rosin soap. The rosin soap lake is equal in covering power (determined by tinting in white) to the product obtained without the use of rosin soap, and is equal in this respect to the ordinary commercial barium lithol toner. It is much brighter in shade, cleaner in tone, and when ground into litho varnish to produce a printing ink, the latter product gives a print which possesses a bright, fiery, bronze-free tone not hitherto possible from the toners of the lithol red class. In other words, this new product possesses the strength of a toner and the printing qualities of a lake.

Example II

The procedure is the same as that described in Example I except that instead of 26.5 parts of caustic soda in the rosin, only sufficient of this alkali is used to convert the rosin into a soap. The product so obtained is a pigment much lighter and yellower than that described under Example I.

The yield is equivalent to that obtained in Example I.

Example III

The same procedure is used as in Example I except that 90 parts of rosin is prepared as rosin soap instead of 75 parts as in Example I, and 88 parts of calcium chloride are used to effect the precipitation instead of the 240 parts of barium chloride. The product so obtained corresponds in depth of shade to the ordinary calcium lithol red used in the trade.

The yield is approximately 275 parts of dry powder compared with 200 parts obtained without the rosin soap. The superiority of the rosin soap lake is similar in this case to that described in Example I.

Example IV

The procedure is the same as that described in Example III except that the rosin soap is added to the azo compound at the boil, and the precipitation and development of the color is carried out at this temperature. The pigment obtained by this procedure is comparable in blueness of tone to that described in DRP-245,747 (Friedlander X, page 936).

The yield is equivalent to that of Example III. The product is maroon or claret in shade, whereas that described in Example III is bluish red. The product possesses the same qualities as to power to produce an ink yielding a bronzeless printing tone.

Example V

A solution of 52.25 parts of the sodium salt of paratoluidinemetasulphonic acid ($CH_3 : SO_3 : NH_2 = 1 : 3 : 4$) is diazotized with 18 parts of nitrite of soda and 65 parts of 20° Bé. muriatic acid.

50 parts of betaoxynaphthoic acid $$(OH : COOH = 2 : 3)$$

is dissolved in a solution of 15 parts of sodium hydroxide in 400 parts of water. To this is then added 54 parts of soda ash in 300 parts of water.

In a separate container 22.5 parts of rosin is added to a solution of 3.6 parts of sodium hydroxide in 300 parts of water, and the solution boiled to effect the formation of the rosin soap. This solution of rosin soap is now added to the above described solution of beta-oxynaphthoic acid, the volume brought to the equal of 1250 parts of water, 11.5 parts para soap added, and the temperature adjusted to 40° C. The above described diazo preparation is then run in whereupon the azo coupling proceeds quickly and to good completion. The charge is adjusted to neutrality, the volume brought to the equivalent of 25,000 parts of water, heated to 57° C, and the color precipitated with a solution containing 86 parts of calcium chloride. The charge is then brought to the boil, and digested at this temperature for 15 minutes, after which it is washed, filtered, and dried in the usual manner. The yield is approximately 146 parts of pigment compared with 112 parts in a charge carried out in exactly the same way but without the rosin. The rosin soap lake is equal in strength to the normal product and is superior to it in richness of shade, clarity of tone, and freedom from bronze on the printing tone obtained from printing inks prepared from it.

Example VI 44.7 gr. of 2-naphthylamine 1-sulphonic acid is diazotized according to the procedure described in Example I using the proportionate amount of nitrite and muriatic acid.

74.0 parts of the metanitranilide of beta-oxynaphthoic acid is dissolved in 16.5 parts of sodium hydroxide in 200 parts of water at the boil. The volume is then brought to the equivalent of 1000 parts of water, and the temperature adjusted to 25° C. The above described diazo is then added during 1 hour and the charge then slowly heated to 40° C. There is then added the rosin soap solution prepared from 30 parts of rosin, 4 parts sodium hydroxide, and 300 parts of water. The charge is then precipitated with 96 parts of barium chloride in 2000 parts of water, brought to the boil, and boiled 30 minutes. The product is washed, filtered, and dried. The yield of the finished product corresponds to approximately 152 parts of dry material as compared with 122 parts of a charge prepared normally without the aid of the rosin soap. The rosin soap lake is richer and deeper in shade, clearer in color tone, and possesses higher covering power as determined by tinting out with white.

Example VII

A solution of 28.6 parts of alphanaphthylamine, 30 parts of 20° Bé. muriatic acid and 400 parts of water is diazotized in the usual manner with 66 parts of 20° Bé. muriatic acid and 15 parts of nitrite of soda.

81 parts of alpha naphthol 5-sulphonic acid ($OH:SO_3H=1:5$) is dissolved in 45 parts of soda ash and 200 parts of water. To this is added 10 parts of para soap.

In a separate container 16 parts of rosin is added to a solution of 3.5 parts of soda ash in 150 parts of water, and the solution boiled to effect the formation of the rosin soap. This solution of rosin soap is now added to the above described solution of alpha naphthol sulphonic acid, the volume brought to the equal of 600 parts of water, and the temperature adjusted to 15° C. The above described diazo preparation is then run in, in 30 minutes, whereupon the azo coupling proceeds quickly and to good completion. The dyestuff is then made neutral with muriatic acid and the volume brought to the equivalent of 4000 parts of water and the temperature adjusted to 65° C. To this is added a solution of 25 parts of caustic soda in 300 parts of water. The azo compound is then precipitated at 65° C. with a solution of 50 parts of calcium chloride, 70 parts of 20° Bé. muriatic acid in 400 parts of water. The color is then brought to the boil and boiled ½ hour, after which it is washed, filtered, and dried in the usual manner. The yield is approximately 106 parts of pigment compared with 90 parts in a charge carried out in exactly the same way without the rosin.

Example VIII

A solution of 52.25 parts of the sodium salt of paratoluidine-metasulphonic acid ($CH_3:SO_3;NH_2=1:3:4$) is diazotized with 18 parts of nitrite of soda and 65 parts of 20° Bé. muriatic acid.

50 parts of betaoxy-naphthoic acid ($OH:COOH=2:3$) are dissolved in a solution of 21 parts of sodium hydroxide in 400 parts of water. To this are then added 51.5 parts of soda ash in 300 parts of water. The temperature of the betaoxy-naphthoic acid solution is adjusted to 40° C. and the above described diazo preparation is then run in whereupon the azo coupling proceeds quickly and to good completion. After stirring a short time the dyestuff is filtered.

The soda salt dye paste is then reslurried in 25,000 parts of water at 40° C. To this are added 11.5 parts of para soap in 60 parts of water. In a separate container 6 parts of rosin are added to a solution of 1.6 parts of sodium hydroxide in 400 parts water, and the solution boiled until the formation of the soluble rosin sodium salt is complete. This rosin soap solution is then added to the dye solution and the temperature adjusted to 40° C. and stirred 15 minutes.

In a separate container 100 parts of calcium chloride are dissolved in 2500 parts of water and the temperature adjusted to 27° F., and into this is then run in 10 minutes the dye soap solution. There is then added 50 parts of sodium hydroxide in 250 parts of water and the slurry stirred for 15 minutes. The charge is then heated to the boil and digested at this temperature for ½ hour, after which it is washed, filtered, and dried in the usual manner. The yield is approximately 127 parts of pigment compared with 120 parts in a charge carried out in exactly the same way but without the rosin. The rosin soap as calcium rosinate is 5.51 percent of the finished dry pigment color.

Example IX

A pigment color is prepared in a manner similar to the above and from similar ingredients, but the amount of calcium rosinate is increased to 11.1 percent in the finished dry pigment color. The rosin soap solution is prepared as follows:

13 parts rosin are added to a solution of 2.6 parts of sodium hydroxide in 600 parts of water and the solution boiled until the formation of the soluble rosin sodium salt is complete. This is then added to the dyestuff as in Example VIII. The yield is approximately 134 parts of pigment as compared with 120 parts in a charge carried out in exactly the same way but without the rosin. The calcium rosinate in this case comprises 11.1 percent of the finished dry pigment color.

Example X

A solution of the sodium salt of 2-naphthylamine 1-sulphonic acid corresponding to 111.5 parts of the free acid, is diazotized in the usual manner with 39 parts of sodium nitrite and 204 parts of 20° Bé. muriatic acid.

In a separate container a solution of 80 parts of beta napththol and 36 parts of caustic soda is prepared and made to a volume corresponding to approximately 2500 parts. After the temperature of this solution has been adjusted to 25° C. the diazo suspension, formed as indicated above, is introduced into the beta naphthol solution. When one-half of the diazo suspension has been added a solution of 15 parts of caustic soda dissolved in 40 parts of water is added and the coupling completed. The coupling proceeds rapidly and to good completion. The volume is then made to 13,000 parts and heated to 40° C. in 15 minutes.

In a separate container 150 parts of rosin are added to a solution of 35 parts of caustic soda and 2100 parts of water and the preparation boiled to complete the saponification. This preparation of the rosin is then run into the charge of the azo dye, described above, and the temperature of the combined solutions adjusted to 40° C. In a separate container 270 parts of barium chloride crystals are dissolved in 5000 parts of water and the solution brought to the boil. The charge is then precipitated by introducing the dye soap slurry in 15 minutes at 40° C. into the boiling barium chloride solution and boiling one-half hour. The product is then washed, filtered, and dried and ground in the usual manner.

The yield is approximately 397.5 parts of dry pigment color as compared with 240 parts actually obtained in a charge prepared in a similar manner but without rosin soap. The amount of barium rosinate comprises 40 percent of the finished dry pigment color.

Example XI

The procedure is the same as that described in Example X except that the rosin soap and barium chloride are increased as follows:

250 parts of rosin are added to a solution of 46 parts of sodium hydroxide and 2500 parts of water and boiled to effect complete saponification. The barium chloride is increased to 310 parts in order to take care of the excess rosin. The yield is approximately 498 parts of dry pigment color as compared with 240 parts actually obtained in charge prepared without rosin soap. The increase in yield is 258 parts, the barium rosinate comprising 51.9 per cent of the dry pigment color.

Example XII

The procedure is the same as that described in Example X except the rosin soap and barium chloride are increased as follows:

350 parts of rosin are added to a solution of 58 parts of sodium hydroxide and 3200 parts of water and boiled to effect complete saponification. The barium chloride is increased to 350 parts in order to take care of the excess rosin. The yield is approximately 590 parts of dry pigment color as compared with 240 parts actually obtained in a charge without rosin soap. The increase in yield is 350 parts, the barium rosinate comprising 59.33 percent of the dry pigment color.

The rosin soap lake is equal in strength to the normal product and is superior to it in richness of shade, clarity of tone and freedom from bronze on the printing tone obtained from printing inks prepared from it.

Although we preferably use the metallic derivatives of barium or calcium, or both, we may also use strontium, magnesium, lead or copper or any of the metals which form substantially insoluble metallic soaps with rosin.

Although instances of the use of small amounts of rosin soap as a dispersing agent are known, this invention is distinguished by the fact that we combine a substantial amount of rosin soap with the azo pigment dyestuff formed in the coupling reaction. By a substantial amount we mean an amount sufficient to form greater than 5% of the total weight of the finished lake. Although we may incorporate as little as approximately 5% of rosin soap and as high as 50% or an even greater proportion, the preferred range is from 15 to 30%.

It will be understood, of course, that we do not intend to limit ourselves to the addition of the rosin soap to the azo compounds under the exact conditions specified in the foregoing examples for the reason that in some cases it may be of some advantage in order to secure certain tints or shades to add a portion of the rosin soap during the coupling, or at some other step in the process. We have found that specific results are obtainable if the metallic soap of rosin is precipitated in the presence of the azo compound.

A particular advantage in the use of the pigment prepared according to our invention is in the matter of the bright glossy printing tone obtained therefrom. The bronziness of the printing tone ordinarily present in colors of this kind is eliminated. For example, if equal parts of rosin soap lake and litho varnish of #1 grade (bodied linseed oil) are ground in the ordinary manner on a three roll ink mill, there is obtained a printing ink possessing heavier body, by virtue of the higher oil absorption of the pigment, than is obtainable with a pigment made in the ordinary manner. In place of the litho varnish, other commercial vehicles or combination vehicles may be used. The greatest superiority, however, of this ink is that the resulting printing tone is distinctly superior to an ink made from an ordinary pigment, in the matter of gloss and brilliancy, a property which is presumably due to the higher oil absorption and the better dispersion of the pigment with the oil.

By the term "metallic rosin soap", as used herein, we mean the metal salts of the rosin acids and related compounds which in the case of the alkali metals are soluble in water, and in the case of the alkaline earth and other metals are insoluble in water.

As many apparently widely different embodiments of this invention may be made without departing from the spirit thereof, it is to be understood that we do not intend to limit ourselves to the specific embodiments thereof except as indicated in the appended claims.

We claim:

1. A substantially oil and water insoluble lake which comprises an insoluble metallic salt of an azo dyestuff and from 5 percent to 50% of a non-diluting substratum comprising a substantially insoluble metallic rosinate, said lake having the characteristic of producing a clear, bright, non-bronzy tone.

2. A substantially oil and water insoluble lake which comprises an insoluble metallic salt of an azo dyestuff of acidic character and from 5% to 50% of a nondiluting substratum comprising a substantially insoluble metallic rosinate made from a metal of the group comprising the alkaline earth metals, copper, lead and magnesium, said lake having the characteristic of producing a clear, bright, non-bronzy tone.

3. A substantially oil and water insoluble lake which comprises an insoluble metallic salt of an azo dyestuff and from 5% to 50% of a non-diluting substratum comprising a substantially insoluble metallic rosinate, said lake having been formed by the simultaneous precipitation of the azo-dyestuff and the rosinate, and having the characteristic of producing a clear, bright, non-bronzy tone.

4. A substantially oil and water insoluble lake which comprises the insoluble metallic salt of an azo dyestuff and from 5% to 50% of an insoluble metallic rosinate, said lake having the characteristic of producing a clear, bright, non-bronzy tone.

5. A substantially oil and water insoluble lake which comprises an insoluble metallic salt of an azo dyestuff and from 5% to 50% of a non-diluting substratum comprising an alkaline earth metal rosinate, said lake having the characteristic of producing a clear, bright, non-bronzy tone.

6. The process of preparing a substantially oil and water insoluble lake of an insoluble metallic salt of an azo dyestuff, which comprises simultaneously precipitating a soluble rosinate and an azo dye with a metallic compound, said rosinate being in the amount to form an insoluble rosinate in the proportion of about 5% to 50% of the finished product.

7. The process of preparing a substantially oil and water insoluble lake of an insoluble metallic salt of an azo dyestuff, which comprises simultaneously precipitating a soluble rosinate and an azo dye of acidic character with a metallic compound, said rosinate being in the amount to form an insoluble rosinate in the proportion of about 15 to 30% of the finished product.

8. The process of preparing a substantially oil and water insoluble lake of an azo dyestuff, which comprises mixing an azo dye of acidic character with a rosinate and simultaneously precipitating by means of a metallic compound the insoluble metallic salt of the dye and an insoluble metallic rosinate, said rosinate being in the amount to form an insoluble rosinate in the proportion of about 5% to 50% of the finished product.

9. The process of preparing a substantially oil and water insoluble lake of an azo dyestuff, which comprises mixing a soluble rosinate with an azo dye of acidic character, then adding to the mixture a metallic compound of the group comprising the alkaline earth metals, magnesium, lead, and copper, to precipitate the insoluble metallic rosinate and the metal salt of the azo dye, said rosinate being in the amount to form an insoluble rosinate in the proportion of about 5% to 50% of the finished product.

10. The process of preparing a substantially oil and water insoluble rosin soap lake of an azo pigment dyestuff having a non-diluting substratum, which comprises forming a suspension of diazo-2-naphthylamine-1-sulphonic acid by diazotizing the sodium salt of 2-naphthyl-amine-1-sulphonic acid, coupling said diazo compound with the sodium salt of beta-naphthol in alkaline solution to form an azo pigment dyestuff, adding to said dyestuff an alkaline solution of sodium rosinate, and thereafter adding a solution of barium chloride to simultaneously precipitate the barium salt of said dyestuff and from 15 to 30% of barium rosinate.

In testimony whereof we affix our signatures.

EDWARD R. ALLEN.
ALFRED SIEGEL.